US009017580B2

(12) United States Patent
Dasgupta et al.

(10) Patent No.: US 9,017,580 B2
(45) Date of Patent: Apr. 28, 2015

(54) FIBER REINFORCED POLYMERIC COMPOSITES WITH TAILORABLE ELECTRICAL RESISTIVITIES AND PROCESS FOR PREPARING THE SAME

(75) Inventors: Samudra Dasgupta, Karnataka (IN); Madishetty Narayana Rao Jagdish Kumar, Karnataka (IN); Sundaram Sankaran, New Delhi (IN)

(73) Assignee: The Director General, Defence Research & Development Organisation (DRDO), New Delhi (IN)

( * ) Notice: Subject to any disclaimer, the term of this patent is extended or adjusted under 35 U.S.C. 154(b) by 358 days.

(21) Appl. No.: 13/510,793

(22) PCT Filed: Nov. 22, 2010

(86) PCT No.: PCT/IB2010/055323
§ 371 (c)(1),
(2), (4) Date: May 18, 2012

(87) PCT Pub. No.: WO2011/064707
PCT Pub. Date: Jun. 3, 2011

(65) Prior Publication Data
US 2012/0261623 A1 Oct. 18, 2012

(30) Foreign Application Priority Data
Nov. 24, 2009 (IN) ............ 2424/DEL/2009

(51) Int. Cl.
| | | |
|---|---|---|
| *H01B 1/20* | (2006.01) | |
| *B32B 37/14* | (2006.01) | |
| *B29C 70/88* | (2006.01) | |
| *B29C 70/02* | (2006.01) | |
| *B29K 63/00* | (2006.01) | |
| *B29K 105/16* | (2006.01) | |
| *B29K 309/08* | (2006.01) | |
| *B29K 707/04* | (2006.01) | |

(52) U.S. Cl.
CPC ...... *B29K2995/0005* (2013.01); *Y10S 977/742* (2013.01); *Y10S 977/779* (2013.01); *Y10S 977/842* (2013.01)

(52) U.S. Cl.
CPC ............ *B29C 70/882* (2013.01); *B29C 70/025* (2013.01); *B29K 2063/00* (2013.01); *B29K 2105/16* (2013.01); *B29K 2105/165* (2013.01); *B29K 2105/167* (2013.01); *B29K 2309/08* (2013.01); *B29K 2707/04* (2013.01);
(Continued)

(58) Field of Classification Search
None
See application file for complete search history.

(56) References Cited

U.S. PATENT DOCUMENTS

| 3,486,952 A | 12/1969 | Vanstrum et al. |
|---|---|---|
| 4,438,059 A | 3/1984 | Mollman et al. |

(Continued)

FOREIGN PATENT DOCUMENTS

| CN | 101712076 | 5/2010 |
|---|---|---|
| EP | 2112192 | 10/2009 |
| GB | 2456367 | 7/2009 |

OTHER PUBLICATIONS

IPRP for related PCT/IB2010/055323 completed on Mar. 16, 2012.
ISR for related PCT/IB2010/055323 mailed on Oct. 6, 2011.
WO for related PCT/IB2010/055323 completed on Mar. 16, 2012.

*Primary Examiner* — Mark Kopec
*Assistant Examiner* — Katie L Hammer
(74) *Attorney, Agent, or Firm* — Ladas & Parry, LLP

(57) ABSTRACT

The present invention relates to polymer composite materials, more particularly relates to composite materials with tailor made surface electrical resistivities in the range of $10^9$ to $10^{-1}$ Ω/sq. and process of making the same. The process for preparing Fiber Reinforced Polymeric (FRP) Composite, said process comprising acts of homogeneously mixing 1-30% by weight of different electrically conducting fillers in matrix resin system to obtain resin mix; wetting dry preforms using the resin mix; compacting the wetted preforms to obtain green composite; curing the green composite; and post-curing the cured composite to prepare the FRP Composite.

15 Claims, 3 Drawing Sheets

(56) References Cited

U.S. PATENT DOCUMENTS

Figure 1:
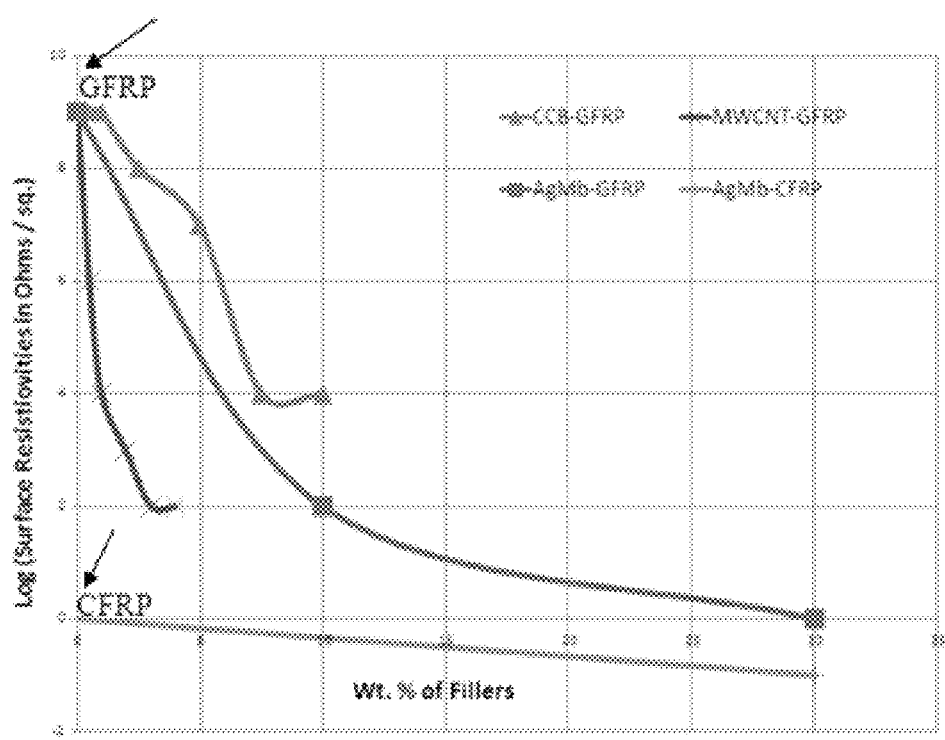

| | | | |
|---|---|---|---|
| 4,622,091 A * | 11/1986 | Letterman | 156/286 |
| 5,820,788 A | 10/1998 | Smith | |
| 6,017,610 A | 1/2000 | Abe et al. | |
| 6,740,410 B2 | 5/2004 | Fahey et al. | |
| 2004/0077771 A1 * | 4/2004 | Wadahara et al. | 524/495 |
| 2005/0281999 A1 * | 12/2005 | Hofmann et al. | 428/304.4 |
| 2007/0237942 A1 * | 10/2007 | Linker | 428/309.9 |
| 2008/0197526 A1 * | 8/2008 | Shafi et al. | 264/137 |
| 2008/0254296 A1 * | 10/2008 | Handa et al. | 428/408 |
| 2008/0308972 A1 * | 12/2008 | Fanget | 264/328.1 |
| 2009/0169870 A1 | 7/2009 | Zheng | |
| 2012/0177905 A1 * | 7/2012 | Seals et al. | 428/221 |

\* cited by examiner

FIBER REINFORCED POLYMERIC COMPOSITES WITH TAILORABLE ELECTRICAL RESISTIVITIES AND PROCESS FOR PREPARING THE SAME

CROSS-REFERENCE TO RELATED APPLICATIONS

This application is the U.S. National Stage of International Patent Application No. PCT/IB2010/055323 filed on Nov. 22, 2010, which claims priority to Indian Patent Application No. 2424/DEL/2009 filed on Nov. 24, 2009 the disclosures of which are hereby incorporated by reference in their entireties.

TECHNICAL FIELD

The present disclosure relates to polymer composite materials, more particularly relates to composite materials with tailor made electrical properties and process of making the same.

BACKGROUND OF DISCLOSURE AND PRIOR ARTS

Conventional Fiber Reinforced Polymers (FRP) offer very limited scope to the material designers in terms of desired electrical resistivities on their surfaces. While Glass FRP (GFRP) provide a highly insulating surface (surface resistivity>$10^9$ $\Omega$/sq.), a Carbon FRP (CFRP) surface is a lot more conductive (surface resistivity≈$10^0$ $\Omega$/sq.). However, the existing technologies do not allow these FRP materials to be further tailored for any custom specified intermediate surface resistivity value. The present technology helps to achieve the same in thermosetting polymer based composite materials with the conventional glass or carbon reinforcements wherein, the surface resistivity values can be tuned to any given order in the range of $10^9$ $\Omega$/sq. to $10^{-1}$ $\Omega$/sq. based on the specific end use requirements.

Polymer composite materials often find themselves disadvantaged for a certain class of electrical/electromagnetic applications which demands specific ranges of electrical resistivities in the materials. In fact, if we place the entire gamut of materials alongside their respective surface resistivities, we get the resistivity ladder as shown in Table 1.

TABLE 1

Resistivity Ladder

| Class of Materials | Surface Resistivity $\Omega$/sq. |
|---|---|
| Polymers & Ceramics | $10^{12}$-$10^{16}$ |
| Antistatic Materials | $10^7$-$10^{11}$ |
| Statically Dissipative Composites | $10^1$-$10^6$ |
| EMI Shielding Composites | $10^{-2}$-$10^0$ |
| Carbon | $10^{-5}$-$10^{-3}$ |
| Metals | $10^{-8}$-$10^{-6}$ |

The extreme ends of the above spectrum are occupied by the base materials (metals/polymers/ceramics/carbon), and the intermediate ranges are mostly dominated by composite materials, coatings/paints etc. Numerous methods have been explored in the past to modify the electrical characteristics of otherwise insulating composites/paints etc. for certain specified applications (mostly antistatic & EMI shielding), including addition of special fillers like carbon black, carbon nanotubes (CNTs), nickel coated graphite (NCG), bromine intercalated graphite etc. For example, thermoplastic based antistatic polymers with chopped carbonaceous fibers which give a surface resistivity of the $10^4$-$10^{10}$ $\Omega$/sq. order is known in the art (U.S. Pat. No. 5,820,788) as is a conductive laminate with room temperature resistance of $10^6$-$10^{12}$ $\Omega$/sq. (U.S. Pat. No. 6,017,610). Even multilayer laminates with comparable surface properties are also reported (U.S. Pat. No. 6,740,410B2). Very recent literature also reveals CNT based antistatic coating compositions (U.S. Pat. No. 0,169,870A1). Various other polymer and resin compositions are also known which can be used for a variety of electrical/electromagnetic applications including antistatic surfaces and EMI shields. However, all these available technologies do not address the issue of tailoring conventional structural grade composite laminates for a wide enough range of surface resistivity properties ($10^9$-$10^{-1}$ $\Omega$/sq.) to render them versatile for most relevant applications. This is precisely the problem that the present disclosure intends to solve.

Prior art describes few methods of tailoring conventional polymer composites. In the prior art, tailoring polymer based materials for variety of electrical applications have always been guided by three major philosophies; viz. use of external/internal surfactants, use of conductive fillers and the use of polymeric additives. Each of these routes has their own sets of pros and cons. For example, U.S. Pat. No. 5,820,788 describes a class of materials with 8-20 wt. % of chopped carbon fibers in resin which results in surface resistivity values in the range of $10^4$-$10^{10}$ $\Omega$/sq. Unlike the present invention, neither are such fiber filled resins capable of primary structural applications nor do they offer a wide enough scope of tailorability to the surface resistivity of the composites. The fiber loading also is very high, which is always associated with processing complications. Again, in U.S. Pat. No. 6,017,610, a conductive polymer (PAni) based laminate has been disclosed which has surface resistivity in the order of $10^6$-$10^{12}$ $\Omega$/sq., but can be at best used as thermoplastic films and tapes. Similar observations can also be made for the materials disclosed in U.S. Pat. No. 6,740,410B2.

Figure 2:
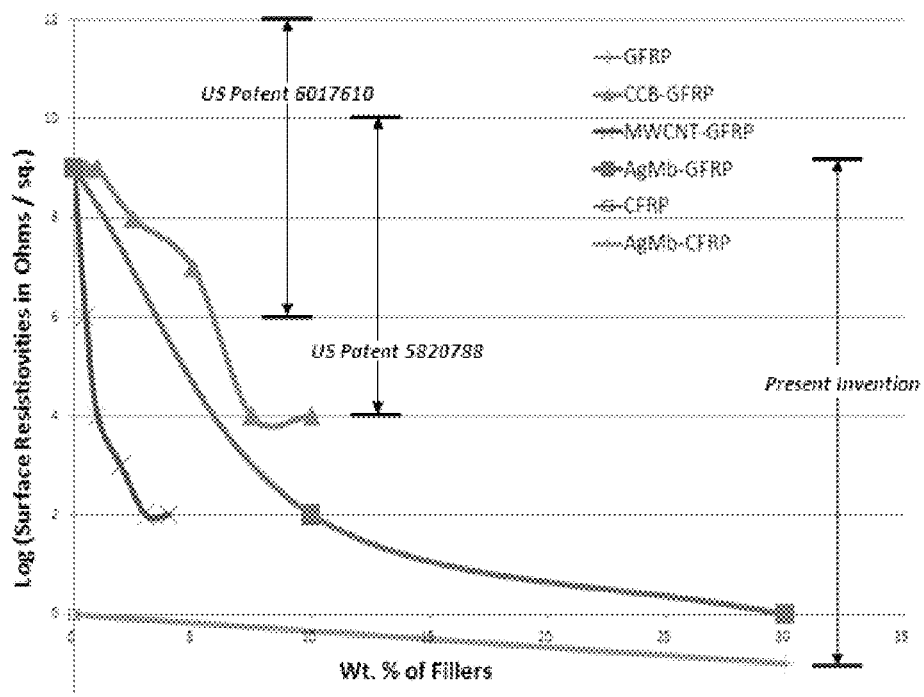

FIG. 1 illustrates the achievable range of surface electrical resistivities for various embodiments of the present invention in the form of surface resistivity vs. filler composition calibration curves. A brief comparison of the present invention vis-à-vis the prior art status can be understood from the illustration given in FIG. 2, wherein the prior art value ranges are superposed.

STATEMENT OF THE DISCLOSURE

Accordingly, the disclosure provides for a process for preparing Fibre Reinforced Polymeric (FRP) Composite of tailorable surface electrical resistivities, said process comprising acts of homogeneously mixing 1-30% by weight of electrically conducting fillers in matrix resin system to obtain resin mix; wetting dry preforms using the resin mix; compacting the wetted preforms to obtain green composite; curing the green composite; and post-curing the cured composite to prepare the FRP Composite, and also provides for FRP composites comprising conductive fillers ranging from about 1% to about 30% by weight in matrix resin system, wherein said FRP composites have densities ranging from about 0.9 g/cc to about 2.0 g/cc, surface electrical resistivities ranging from about $10^9$ $\Omega$/sq. to about $10^{-1}$ $\Omega$/sq., ambient temperature storage modulii ranging from about 4 GPa to about 15 GPa, ILSS ranging from about 15 MPa to about 50 MPa and capable of withstanding temperature up to 170° C.

BRIEF DESCRIPTION OF THE ACCOMPANYING DRAWINGS

The novel features and characteristic of the disclosure are set forth in the appended claims. The invention itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying drawings:

FIG. 1. Shows calibration Curve for Surface Resistivities vs. Fillers (% by wt.) according to present disclosure, FIG. 2. Shows calibration curve for surface resistivities vs. Fillers (% by wt.) according to present disclosure Vs. Prior Art, and FIG. 3. Shows DMA Thermograms.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, and drawings are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter-alia, a process for preparing Fibre Reinforced Polymeric (FRP) Composite and a FRP composite with tailorable electrical resistiveness.

The disclosure is in relation to a process for preparing Fibre Reinforced Polymeric (FRP) Composite of tailorable surface electrical resistivities, said process comprising acts of homogeneously mixing 1-30% by weight of electrically conducting fillers in matrix resin system to obtain resin mix; wetting dry preforms using the resin mix; compacting the wetted preforms to obtain green composite; curing the green composite; and post-curing the cured composite to prepare the FRP Composite.

In one embodiment of the disclosure the filler is selected from a group comprising conductive carbon black, silver coated hollow glass microspheres, and carbon nanotubes.

In one embodiment of the disclosure wherein the conductive carbon black is homogeneously manually mixed in the matrix resin by weight ranging from about 1% to about 10% of the resin mix.

In one embodiment of the disclosure wherein the silver coated hollow glass microspheres are homogeneously manually mixed in the matrix resin by weight ranging from about 1% to about 30% of the resin mix.

In one embodiment of the disclosure the carbon nanotubes are homogeneously mixed in the matrix resin by ultrasonication and shear homogenization process by weight ranging from about 0.1% to about 4% of the resin mix.

In one embodiment of the disclosure the compacting of the wet preforms are carried out using a process selected from a group comprising vacuum bagging, matched die molding, compression molding and autoclave molding.

In one embodiment of the disclosure the curing of the green composite is carried out at room temperature for about 24 hours or at elevated temperature ranging from about 80° C. to about 180° C. for about 2 to 4 hours.

In one embodiment of the disclosure the post-curing is carried out at temperature ranging from about 120° C. to about 350° C. for about 2-4 hours.

The disclosure is in relation to FRP composites comprising conductive fillers ranging from about 1% to about 30% by weight in matrix resin system, wherein said FRP composites have densities ranging from about 0.9 g/cc to about 2.0 g/cc, surface electrical resistivities ranging from about $10^9$ Ω/sq. to about $10^{-1}$ Ω/sq., ambient temperature storage modulii ranging from about 4 GPa to about 15 GPa, ILSS ranging from about 15 MPa to about 50 MPa and capable of withstanding temperature up to 170° C.

In one embodiment of the disclosure the conductive carbon black has particle size ranging from about 10 microns to about 100 microns and bulk electrical resistivity of less than about 100 Ω-cm.

In one embodiment of the disclosure the silver coated hollow glass microspheres have diameter ranging from about 20 microns to about 200 microns and silver content ranging from about 10% to about 50% of bulk weight of the microspheres.

In one embodiment of the disclosure the carbon nanotubes are single or multi walled with outer diameter ranging from about 2 nm to about 100 nm, length ranging from about 100 nm to about 2000 nm, and are selected from a group comprising crude carbon nanotubes, purified carbon nanotubes, with purity varying from about 30% to 100% by weight, non-functionalized carbon nanotubes and functionalized carbon nanotubes, wherein said functionalization is carried out using amine or hydroxyl termination.

In one embodiment of the disclosure the reinforcement fibers are selected from a group comprising glass fibers, carbon fibers and aramid fibers in forms selected from a group of woven fabrics, unidirectional tapes, and chopped strand mats.

In one embodiment of the disclosure the matrix resin system comprises resin and hardener, wherein said resin is a thermosetting resin selected from a group comprising novolac based epoxy, DGEBA based epoxy, vinyl esters, and polyesters, and said hardener for epoxy resins is selected from a group comprising diethyl triamine (DETA), triethylene tetramine (TETA), diamino diphenyl methane (DDM) and diamino diphenyl sulphone (DDS).

Salient Features

The salient features of the present invention are:

The process of developing composite structures with any user defined surface resistivity within the band of $10^9$ Ω/sq. to $10^{-1}$ Ω/sq. without significantly altering the mechanical properties of the conventional FRP materials.

The choice of correct chemistry in terms of different fractions of one or more fillers (conductive carbon black, carbon nanotubes, silver coated glass hollow microspheres and there various combinations thereof) to be added to the laminating resin.

Choice of matrix binder material for desired temperature withstandability without compromising on any of the functional properties of the materials Every electrical/electromagnetic application of materials demands a specific range of electrical resistivity. Accordingly, the material class is chosen for any specific application in question. For instance, if reasonably high electrical conductance is necessitated by an application, the material designer shifts from a composite approach to a metallic configuration. However, such design considerations based on electrical property alone always involve incidental compromises, mostly in terms of weight penalties.

The present disclosure solves most of these problems, wherein it allows the designer to stick to the same/similar composite materials and tailor the electrical conductance of the same as per the exact requirements. As a result, the designer can continue to reap the benefits of polymer composite materials in the structure in terms of its conventional advantages like superior strength to weight ratio, lower part counts, lower overall cost, aesthetics etc., without compromising on the electrical/electromagnetic demands. Though certain similar composite material designs and concepts are known in the art, they use fillers based rubber composites or painting/coating technologies. While the former invariably involves huge weight penalties owing to the high density fillers, the latter has question marks about their durability, environmental stability and regarding the addition of parasitic weights on the systems. The present invention attempts to circumvent these issues. FIG. 1 depicts how the same can be achieved by using different compositions of various fillers.

For instance, many applications require a minimum surface conductance in the material to enable the dissipation of static charges which may be developed in course of its operation (antistatic surface applications). While metals or carbon fiber composites are inherently antistatic, they are an overdesign for antistatic requirements alone and may not be optimally suited in many cases. In such scenario, the present invention will allow the designer to retain conventional glass fiber based composites and yet achieve the desired antistatic properties. This allows the designer to continue reaping one or more of the benefits like low cost (compared to carbon composites), reduced weight (compared to metals), higher stability & longevity (compared to any antistatic paint), much better electromagnetic transparency (compared to metals & carbon based composites; especially for radomes & antennae covers in ground based or air-borne systems) etc. In applications like radomes, the material design demand a very high electromagnetic transparency coupled with an antistatic surface finish (to minimize chances of charge build-up and arc formation between the radome and the antennae elements within). Metals or carbon fiber composites can not be used for such applications as they are opaque to most EM waves. Under such or similar other conditions, the present practice is to use antistatic paints on the surface of the material. But the present invention offers superior stability & longevity (compared to any antistatic paints) with lesser weight penalties (almost 10% reduction in weight as compared to the painted counterpart). This technology provides the desired EM transparency & antistatic properties in-built together in a single material. For any other applications, where metals or carbon based composites can be used for the same antistatic properties, the use of the above technology will still offer one or more of the benefits like lower cost (compared to glass fiber composites; in India, a carbon fiber composite will be approximately 10 times costlier) and reduced weight (compared to metals; these are about 60% of the weight of even lighter metals like Aluminium).

Similarly, a few applications demand a certain minimum level of surface & volume conductance in the material to enable the reflection/absorption of the incident EM waves and shield/protect the electronics within. While metals or carbon fiber composites are inherently conducting and are conventionally used for such EMI shielding applications, they have their own cons as described above. The present invention allows the designer to continue reaping benefits of conventional composites but still achieve the desired functionality of EMI shielding. Presently, all EMI shielding requirements are mostly met by using metallic structures, and sometimes by using carbon fiber based composites. In rare occasions, thin layer of metallic paints are also used. The current invention once again offers one or more of the benefits described above.

In addition to catering for similar applications and scope, the present invention on the other hand also offers FRP composites capable of being used as primary load bearing structures. Further, by extending the scope of external additives beyond conductive polymers, carbon black and few other organic and inorganic surfactants to some novel and interesting materials like the CNTs, metal coated glass microballoons etc., the horizon of tailorability in the desired properties have also been expanded (refer to FIG. 2 for quick comparison).

The matrices used are epoxy (novolac and Diglycidyl Ether of Bisphenol-A DGEBA based) based thermosetting resin system. However, the same concepts are extendable for any other thermosetting polymeric resins like polyesters, vinyl esters etc. The hardener systems used for epoxy resins were aliphatic amines such as Diethylene Triamine (DETA), Triethylene Tetramine (TETA) etc and aromatic di-amines such as Diamino diphenyl methane (DDM), Diamino diphenyl sulphone (DDS) etc in the weight fraction of 0.1 to 0.4. The desired or exact proportion of this hardener is fully dependent on the epoxy equivalent weight of the resin. The conductive fillers are in the forms of conductive grade carbon black powder (particle size 10-100 microns and bulk resistivity of less than 100 $\Omega$-cm), carbon nanotubes (CNTs) (30-100% pure, singlewall or multiwall; crude or purified; open ended or capped; functionalized or as produced, 2-100 nm outer diameter and 100-2000 nm length) or metallic coated hollow glass microspheres (silver/copper/gold/nickel/cobalt coated, overall metal content of 10-50 wt. % and diameter ranging from 20 to 200 microns).

Process:

The specific types and quantities of the chosen fillers are dispersed in the matrix resin by employing appropriate methods like manual mixing, shear homogenization, ultrasonication etc. In case of metal coated microspheres, these are to be added in lots with gentle mixing till a homogenous and thixotropic mixture results. Following this, the hardener is to be added and uniformly mixed under appropriate conditions, as per the nature of resin system chosen. The mix is then used to laminate the top one/two layers of the composite structure by hand lay-up process and molded through vacuum bagging/matching dies. Special care need to be taken to prevent segregation of different phases in the resin mix during or after the lay-up. The green composite then needs to be cured/post cured at temperatures applicable for the resin system used.

Properties:

Depending up on the choice of raw materials, composition and cure schedule, the following range of relevant properties can be achieved:

Density: 0.9 to 2.0 g/cc

Electrical Resistivity: $10^9$ $\Omega$/sq. to $10^{-1}$ $\Omega$/sq.

Glass Transition Temperature (Tg): up to 170° C.

Storage Modulus (Single Cantilever Mode) at Ambient Temperature: 4 to 15 GPa

Inter Lamellar Shear Strength (ILSS): 15 to 50 MPa

The Storage Modulus and ILSS values need to be compared vis-à-vis the conventional GFRP/CFRP (i.e. without any filler) laminated through the same process to compare the effects of the fillers and the process on the same. More correct analyses will be to compare the ratio of the mechanical properties with the densities of the respective composite materials.

WORKING EXAMPLES

Example 1

FRP Composite with Surface Resistance in the Order of $10^7$ $\Omega$/sq. (Antistatic Application)

Raw Materials: The matrix used to fabricate the composite was room temperature curing epoxy (novolac based)—cyclo aliphatic amine hardener system (100:38 by weight). Conductive Carbon Black powder (ENSACO 250G from M/s Timcal, Belgium) was used as the functional filler. The carbon black powders used in these composites have maximum particle size of 45 microns, pour density of 0.135 g/cc and bulk resistivity of less than 10 Ω-cm.

Process: The Carbon Black powder (0.5 gm, 5% by wt. of resin system) were added to the epoxy resin (7.25 gms) at room temperature and stirred manually till homogenous mixture was obtained. Thereafter, the hardener (2.75 gms) was added to the mixture and mixed thoroughly to attain a homogenous mixture. This mix was used to laminate the top 2 layers (7 mil PW glass fabrics) of a GFRP laminate of 100 mm×100 mm size. The laminate was vacuum bagged and cured at room temperature for 24 hours, before being post cured at 120° C. for three hours.

Properties: The following are some of the observed properties of the above-described FRP laminate:

Density: 1.5-1.6 g/cc

Electrical Resistivity: $10^7$ Ω/sq.

Glass Transition Temperature (Tg): 110-120° C.

Storage Modulus (Single Cantilever Mode) at Ambient Temperature: 6-7 GPa

Inter Lamellar Shear Strength: 24-26 MPa

The above reported Storage Modulus and ILSS values need to be compared with that of a conventional GFRP (i.e. without any filler) laminated through the same process, which are 6-7 GPa and 24 MPa respectively for a density of 1.53 g/cc.

Example 2

FRP Composite with Surface Resistance in the Order of $10^2$ Ω/sq. (Space Cloth Application)

Raw Materials: The matrix used to fabricate the composite was room temperature curing epoxy (novolac based)—cyclo aliphatic amine hardener system (100:38 by weight). Multiwall CNTs (N-7000 from M/s Nanocyl, Belgium) was used as the functional filler. The multiwall CNTs (75% purity) used in these composites have a diameter of 2-15 nm, length of 100-2000 nm with 5-20 concentric shells.

Process: The CNTs (0.3 gms, 3% by wt. of resin system) were added to the epoxy resin (7.25 gms) at room temperature and dispersed using a shear homogenizer at 10,000 rpm for 2 minutes. Thereafter, the hardener (2.75 gms) was added to the mixture and mixed thoroughly to attain a homogenous mixture. This mix was used to laminate the top 2 layers (7 mil PW glass fabrics) of a GFRP laminate of 100 mm×100 mm size. The laminate was vacuum bagged and cured at room temperature for 24 hours, before being post cured at 120° C. for three hours.

Properties: The following are some of the observed properties of the above-described FRP laminate:

Density: 1.4-1.5 g/cc

Electrical Resistivity: $10^2$ Ω/sq.

Glass Transition Temperature (Tg): 110-120° C.

Storage Modulus (Single Cantilever Mode) at Ambient Temperature: 5-6 GPa

Inter Lamellar Shear Strength: 24-28 MPa/(g/cc)

The above reported Storage Modulus and ILSS values need to be compared with that of a conventional GFRP (i.e. without any filler) laminated through the same process, which are 6-7 GPa and 24 MPa respectively for a density of 1.53 g/cc.

Example 3

FRP Composite with Surface Resistance in the Order of $10^{-1}$ Ω/sq. (EMI Shielding Application)

Raw Materials: The matrix used to fabricate the composite was room temperature curing epoxy (novolac based)—cyclo aliphatic amine hardener system (100:38 by weight). Silver coated hollow glass microspheres (Conduct-o-fill SH230S33 from M/s Potters Industries, USA) were used as the functional filler. The silver coated microballoons used in these composites have a mean outer diameter of 44 microns, true density of 0.5 g/cc, bulk resistivity of $2\times10^{-3}$ Ω-cm with overall silver fraction being 33% by weight.

Process: The silver coated microballoons (3 gms, 30% by wt. of resin system) were added to the epoxy resin (7.25 gms) at room temperature and stirred manually till homogenous mixture was obtained. Thereafter, the hardener (2.75 gms) was added to the mixture and mixed thoroughly to attain a homogenous mixture. This mix was used to laminate the top 2 layers (93 gsm carbon fabrics) of a CFRP laminate of 100 mm×100 mm size. The laminate was vacuum bagged and cured at room temperature for 24 hours, before being post cured at 120° C. for three hours.

Properties: The following are some of the observed properties of the above-described FRP laminate:

Density: 0.95-1.0 g/cc

Electrical Resistivity: $10^{-1}$ Ω/sq.

Glass Transition Temperature (Tg): 120-130° C.

Storage Modulus (Single Cantilever Mode) at Ambient Temperature: 5-6 GPa

Inter Lamellar Shear Strength: 25-28 MPa

The above reported Storage Modulus and ILSS values need to be compared with that of a conventional CFRP (i.e. without any filler) laminated through the same process, which are 9-10 GPa and 37 MPa respectively for a density of 1.33 g/cc. In this particular case, since the density of the filler filled composite is significantly lower than the conventional CFRP, it may be more interesting to compare their specific Storage Modulii or ILSS values by dividing the above values with their respective densities, as shown below.

Specific Storage Modulii of CFRP at Ambient Temperature: 6-8 GPa/unit density in g/cc Specific Storage Modulii of Composite described in Example 3 at Ambient Temperature: 5-7 GPa/unit density in g/cc Specific ILSS of CFRP: 26-30 MPa/unit density in g/cc Specific ILSS of Composite described in Example 3: 25-28 MPa/unit density in g/cc Example 4

FRP Composite with Surface Resistance in the Order of $10^4$ Ω/sq. and Temperature Withstandability Up to 150° C. (Higher Temperature Application)

Raw Materials: The matrix used to fabricate the composite was elevated temperature curing epoxy (DGEBA based)—aromatic amine hardener system (100:27 by weight). Conductive Carbon Black powder (ENSACO 250G from M/s Timcal, Belgium) was used as the functional filler. The carbon black powders used in these composites have maximum particle size of 45 microns, pour density of 0.135 g/cc and bulk resistivity of less than 10 Ω-cm.

Process: The Carbon Black powder (1.0 gm, 10% by wt. of resin system) were added to the epoxy resin (7.25 gms) at room temperature and stirred manually till homogenous mixture was obtained. Thereafter, the hardener (2.75 gms) was added to the mixture and mixed thoroughly to attain a homogenous mixture. This mix was used to laminate the top 2 layers (7 mil PW glass fabrics) of a GFRP laminate of 100 mm×100 mm size. The laminate was vacuum bagged and cured at 100° C. for four hours, before being post cured at 160° C. for three hours.

Properties: The following are some of the observed properties of the above-described FRP laminate:
Density: 1.5-1.6 g/cc
Electrical Resistivity: $10^4$ Ω/sq.
Glass Transition Temperature (Tg): 150-170° C.
Storage Modulus (Single Cantilever Mode) at Ambient Temperature: 4-5 GPa
Inter Lamellar Shear Strength: 24-26 MPa/(g/cc)

The above reported Storage Modulus and ILSS values need to be compared with that of a conventional GFRP (i.e. without any filler) laminated through the same process, which are 6-7 GPa and 24 MPa respectively for a density of 1.53 g/cc.

Figure 3:
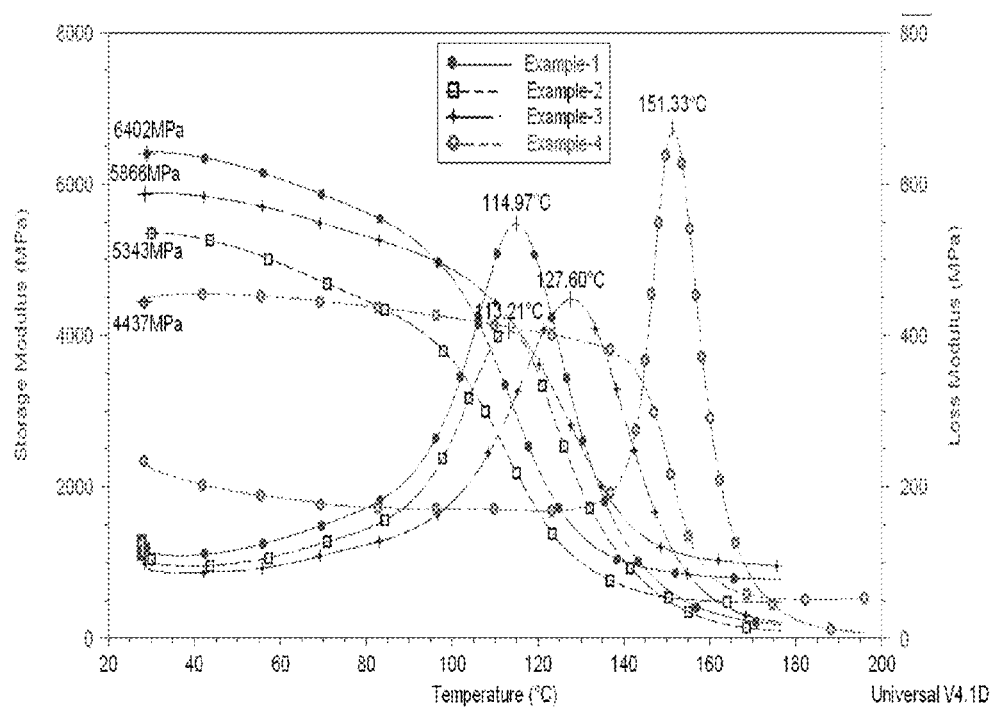

The overlay of the DMA thermograms of the above described composites has been shown in FIG. 3.

Applications
Structural composite materials with any of the following electrical/electromagnetic requirements:
Antistatic surface finish
EMI shielding
Space cloth
Functional Gradation of electrical properties The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention. The technology of the present application explained with the examples should not be construed to limit the scope of the invention.

We claim:

1. Fiber Reinforced Polymeric (FRP) composite, the FRP composite comprising a dry preform, the dry preform comprising reinforcement fibers and the dry preform being laminated a resin mix comprising resin, hardener and electrical conductive fillers selected from one of:
carbon black, ranging from about 1% to about 10% by weight of the resin mix,
silver coated hollow glass microspheres, ranging from about 1% to about 30% by weight of the resin mix, and
carbon nanotubes, ranging from about 0.1% to about 4% by weight of the resin mix, wherein said FRP composite has density ranging from 0.9 g/cc to 2.0 g/cc, a surface electrical resistivity ranging from $10^9$ Ω/sq. to $10^{-1}$ Ω/sq., an ambient temperature storage modulus ranging from 4 GPa to 15 GPa, an Inter Lamellar Shear Strength (ILSS) ranging from 15 MPa to 50 MPa and is capable of withstanding a temperature up to 170° C.

2. The FRP composites as claimed in claim 1, wherein the conductive carbon black has particle size ranging from 10 microns to 100 microns and bulk electrical resistivity of less than 100 Ω-cm.

3. The FRP composites as claimed in claim 1, wherein the silver coated hollow glass microspheres have diameter ranging from 20 microns to 200 microns and silver content ranging from about 10% to about 50% of bulk weight of the microspheres.

4. The FRP composites as claimed in claim 1, wherein the carbon nanotubes are single or multi walled with outer diameter ranging from 2 nm to 100 nm, length ranging from 100 nm to 2000 nm, and are selected from a group comprising crude carbon nanotubes, purified carbon nanotubes, with purity varying from 30% to 100% by weight, non-functionalized carbon nanotubes and functionalized carbon nanotubes, wherein said functionalization is carried out using amine or hydroxyl termination.

5. The FRP composites as claimed in claim 1, wherein the reinforcement fibers are selected from a group comprising glass fibers, carbon fibers and aramid fibers in forms selected from a group of woven fabrics, unidirectional tapes, and chopped strand mats.

6. The FRP composites as claimed in claim 1, wherein said resin is a thermosetting resin selected from a group comprising novolac based epoxy and DGEBA based epoxy.

7. The FRP composite as claimed in claim 1, wherein the dry preform is laminated with 2 layers of the resin mix.

8. The FRP composite as claimed in claim 1, wherein said hardener for epoxy resins is selected from a group comprising diethyl triamine (DETA), triethylene tetramine (TETA), diamino diphenyl methane (DDM) and diamino diphenyl sulphone (DDS).

9. A process for preparing the Fibre Reinforced Polymeric (FRP) Composite of tailorable surface electrical resistivities as claimed in claim 1, said process comprising:
obtaining a resin mix by homogeneously mixing resin with hardener and electrically conducting fillers selected from one of
carbon black, ranging from about 1% to about 10% by weight of the resin mix,
silver coated hollow glass microspheres, ranging from about 0.1% to about 30% by weight of the resin mix, and
carbon nanotubes, ranging from about 1% to about 4% by weight of the resin mix;
laminating dry preforms using the resin mix;
compacting the laminated preforms to obtain a green composite;
curing the green composite; and
post-curing the cured composite to prepare the FRP Composite, wherein said FRP composite has surface electrical resistivities ranging from $10^9$ Ω/sq. to about $10^{-1}$ Ω/sq.

10. The process as claimed in claim 9, wherein the carbon black and the silver coated hollow glass microspheres are manually mixed in the resin mix.

11. The process as claimed in claim 9, wherein the carbon nanotubes are homogeneously mixed in the matrix resin by a process comprising at least one of ultrasonication, manual mixing and shear homogenization.

12. The process as claimed in claim 9, wherein the compacting of the laminated preforms are carried out using a process selected from a group comprising vacuum bagging, matched die molding, compression molding and autoclave molding.

13. The process as claimed in claim 9, wherein the curing of the green composite is carried out at room temperature for about 24 hours or at elevated temperature ranging from about 80° C. to about 180° C. for about 2 to 4 hours.

14. The process as claimed in claim 9, wherein the post-curing is carried out at temperature ranging from about 120° C. to about 350° C. for about 2-4 hours.

15. The process as claimed in claim 9, wherein the dry preform is laminated with 2 layers of the resin mix.

* * * * *